Feb. 22, 1944.  A. M. ERICKSON  2,342,131
APPARATUS FOR TRIMMING ARTICHOKES
Original Filed Nov. 3, 1938  6 Sheets-Sheet 1

INVENTOR.
Arvid M. Erickson
BY Cox Moore & Olsen
attys.

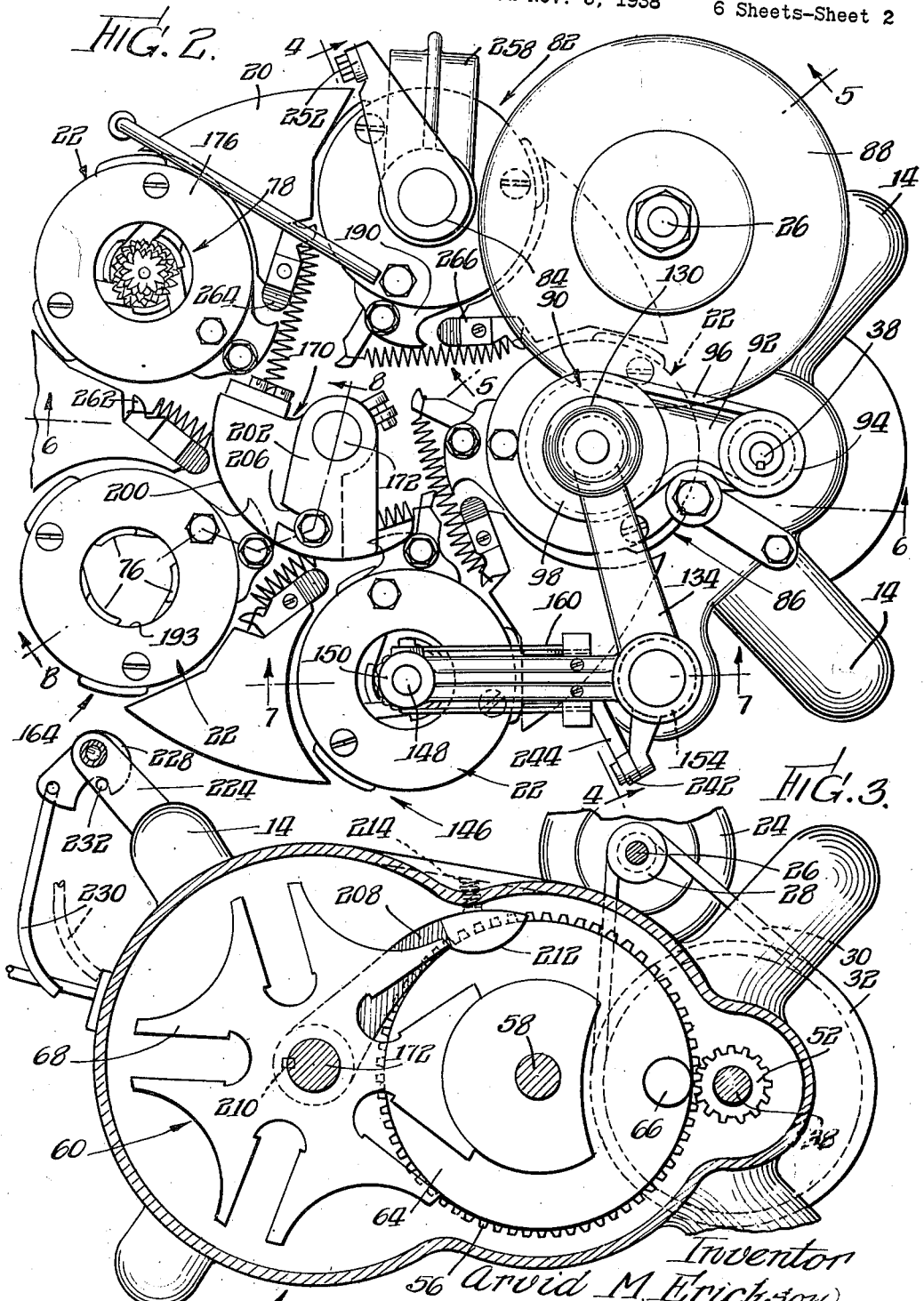

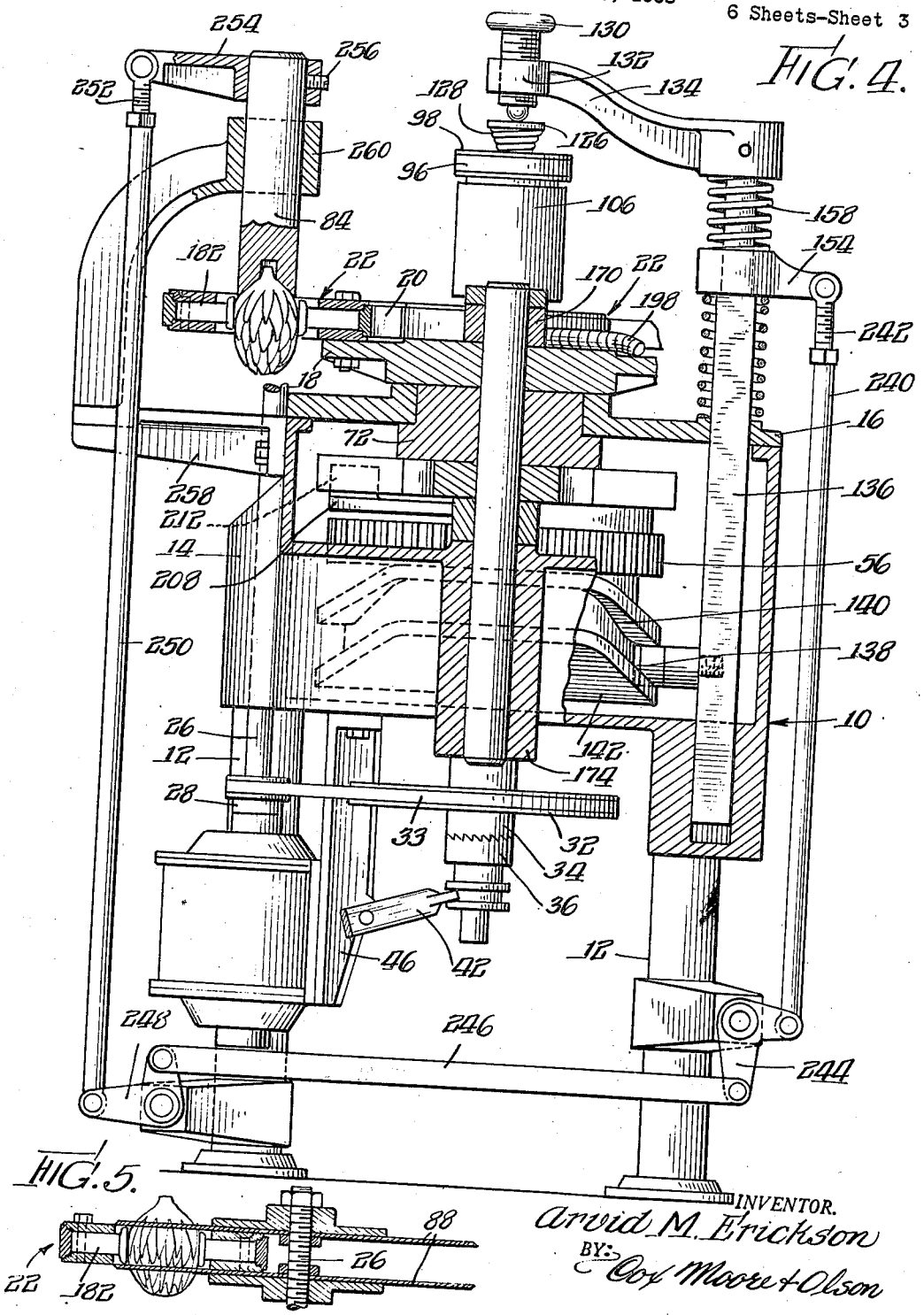

Feb. 22, 1944.   A. M. ERICKSON   2,342,131
APPARATUS FOR TRIMMING ARTICHOKES
Original Filed Nov. 3, 1938   6 Sheets-Sheet 4

INVENTOR.
Arvid M. Erickson
BY Cox, Moore & Olson
attys

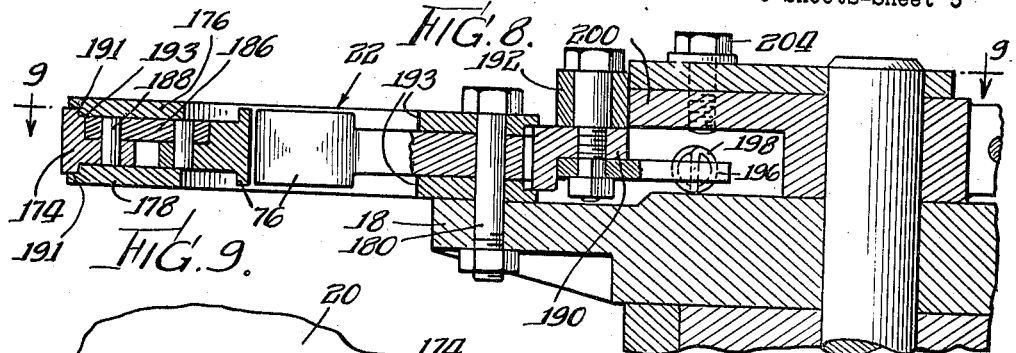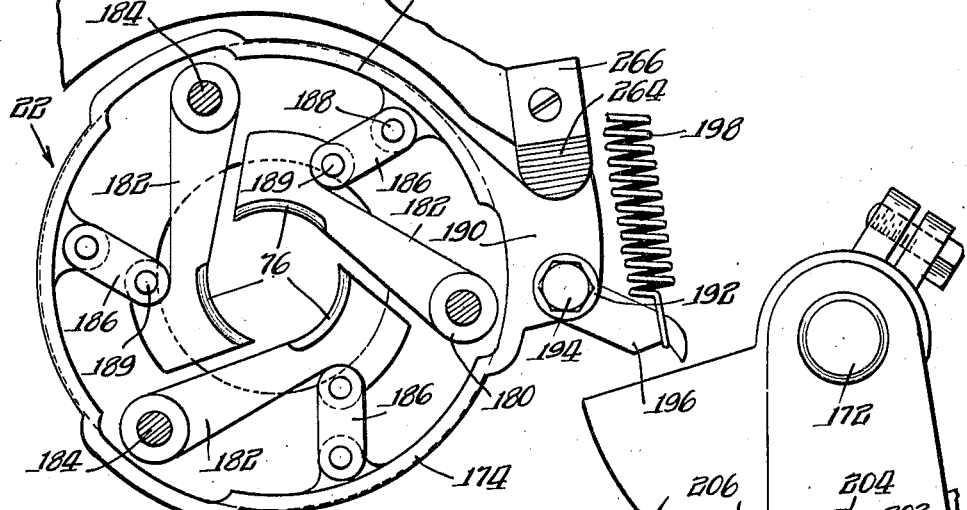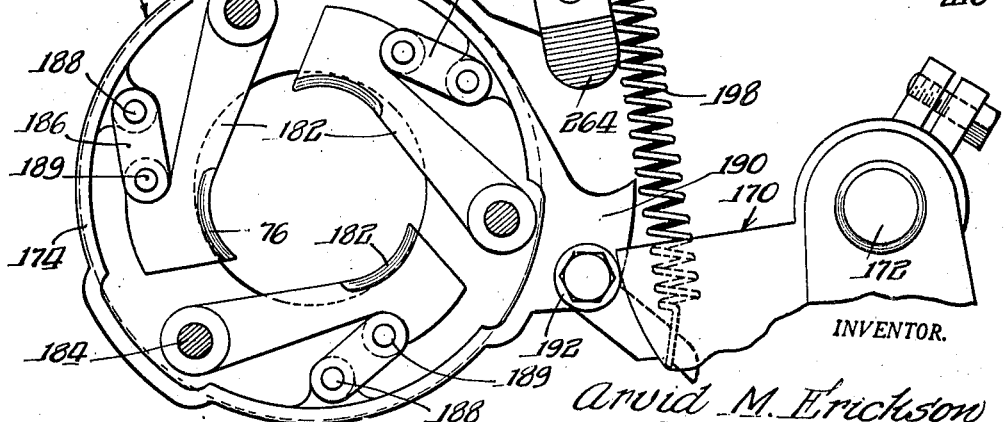

Patented Feb. 22, 1944

2,342,131

UNITED STATES PATENT OFFICE 2,342,131

APPARATUS FOR TRIMMING ARTICHOKES

Arvid M. Erickson, San Jose, Calif., assignor to Barron-Gray Packing Company, San Jose, Calif., a corporation of California Continuation of application Serial No. 238,512, November 3, 1938. This application February 10, 1942, Serial No. 430,272

20 Claims. (Cl. 146—52)

This invention relates to artichoke trimming machines.

Among the objects of the present invention are to provide a completely automatic machine into which successive artichokes of variant size and shape may be fed by hand, the hand released therefrom, and wherein the artichokes as fed are immediately held, automatically centered and positioned in predetermined manner relative to certain trimming and processing devices to which the so positioned artichoke is consecutively and automatically carried, and where at each such device the artichoke is cut transversely through substantially parallel lines through the solid portion thereof, is then cut to sever the heart or solid portion from the outer leaves, is then subjected to a punching action wherein the heart is pressed or punched out of the held artichoke and in such a manner that the heart is discharged to a desired station and the residue is then carried to a subsequent station and discharged at an intermittent point, all in a continuous, particularly rapid manner; to provide in an artichoke trimming machine an improved type of automatic guard mechanism for protecting the hand of the operator; to provide an improved type of mechanism for automatically operating the artichoke chucks to closed position while the turret carrying the chucks is still at rest, whereby the operator may insert an artichoke in the chuck and release the same while the turret is at rest, and yet the chuck will automatically close upon and hold the artichoke; to provide an improved type of means for automatically centering the artichoke in its chuck and/or also for positioning the artichoke predeterminedly in its chuck; to provide in combination with punching means adapted to contact the severed part of the artichoke to push it from the artichoke while held by the chuck members, means for slightly releasing the gripping pressure of the chuck members on the artichoke to facilitate the punching operation; to provide guard mechanism in conjunction with the artichoke centering and positioning mechanism and/or also in connection with the artichoke cutting mechanism for automatically cutting off the power in the event the operator's hand passes beyond a predetermined danger zone; to provide an improved type of operating mechanism for the artichoke centering and positioning device; to provide an improved type of operating mechanism for the rotatable cutter which cuts out the heart or solid portion of the artichoke; to provide punching means or pressing means for punching out the cut-out heart of the artichoke and delivering the same to a predetermined point of discharge, while retaining the unwanted residue in the chuck, while at the same time preventing the discharge of the residue from the chuck; to provide an improved type of mechanism for operating the punching means; to provide a combined machine for carrying out the combined operations hereinbefore set forth, in a completely automatic and continuous manner; to provide an improved process for trimming artichokes; and to provide these and other objects of invention as will be more particularly made apparent from a perusal of the following specification when taken in connection with the accompanying drawings.

Referring now to the drawings:

Figure 2 is a plan view of the machine shown in Figure 1;

Figure 3 is a plan sectional view taken on the line 3—3 of Figure 6;

Figure 4 is a vertical cross sectional view taken on the line 4—4 of Figure 2;

Figure 5 is a cross sectional view through the trimming knives, taken along line 5—5 of Figure 2;

Figure 8 is a cross sectional view taken on the line 8—8 of Figure 2, showing the construction of one of the chucks for holding an artichoke;

Figure 9 is a plan view of one of the chucks for holding an artichoke, showing the holding jaws in closed position;

Figure 10 is a view similar to Figure 9 but showing the holding jaws in open position;

Figure 1:
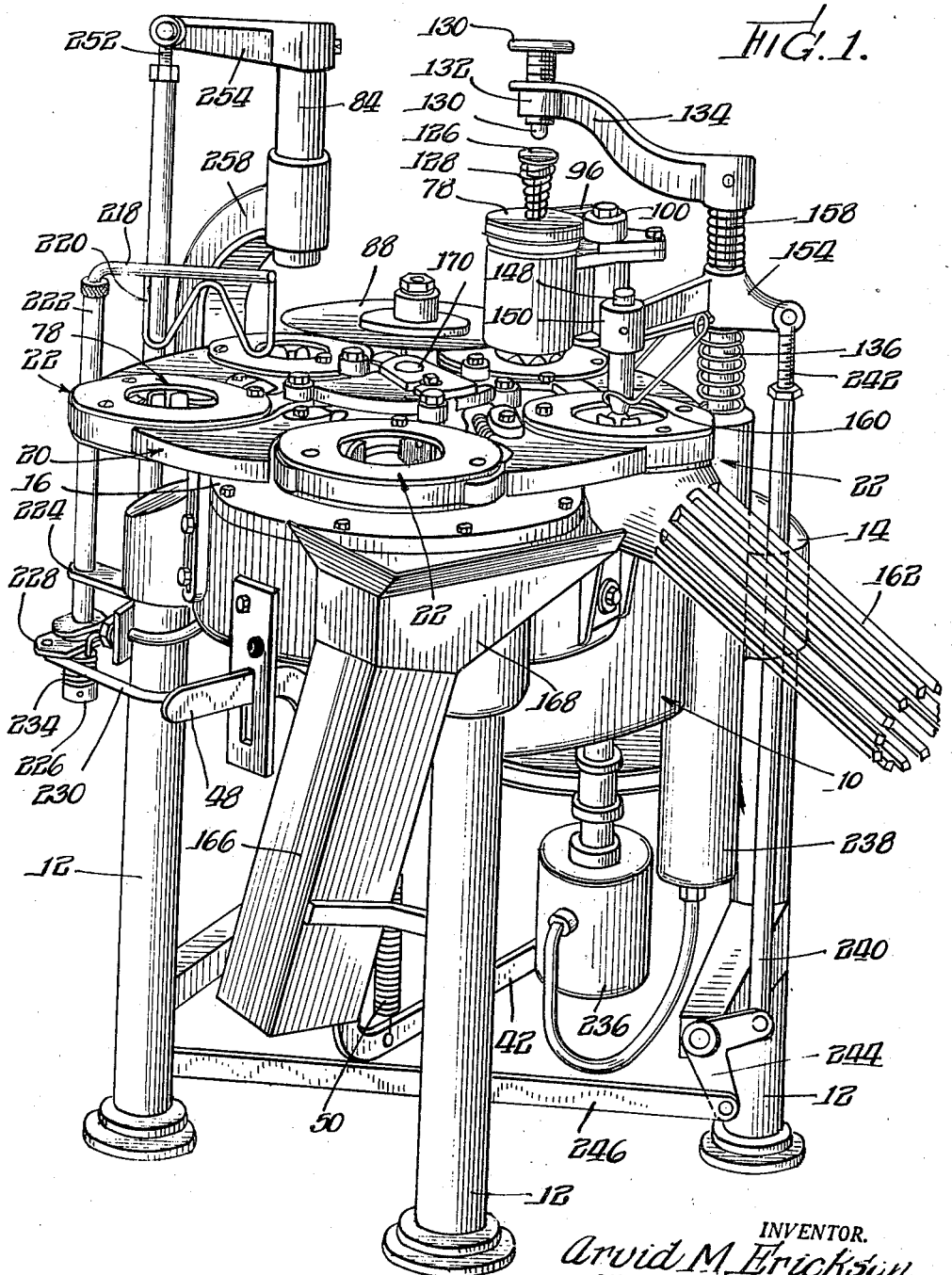
Figure 1 is a front perspective view of an artichoke treating machine.

The machine consists of a body portion or frame 10 and four supporting members or legs 12 which support the frame 10 through bosses 14 formed on the side of the frame. A cover 16 closes the top of the body or frame 10 and also provides suitable bearings for operating shafts, hereinafter described. Positioned above the frame 10 and mounted on a supporting plate 18, is a rotatable table 20 carrying a plurality of artichoke holding chucks 22.

Figure 6:
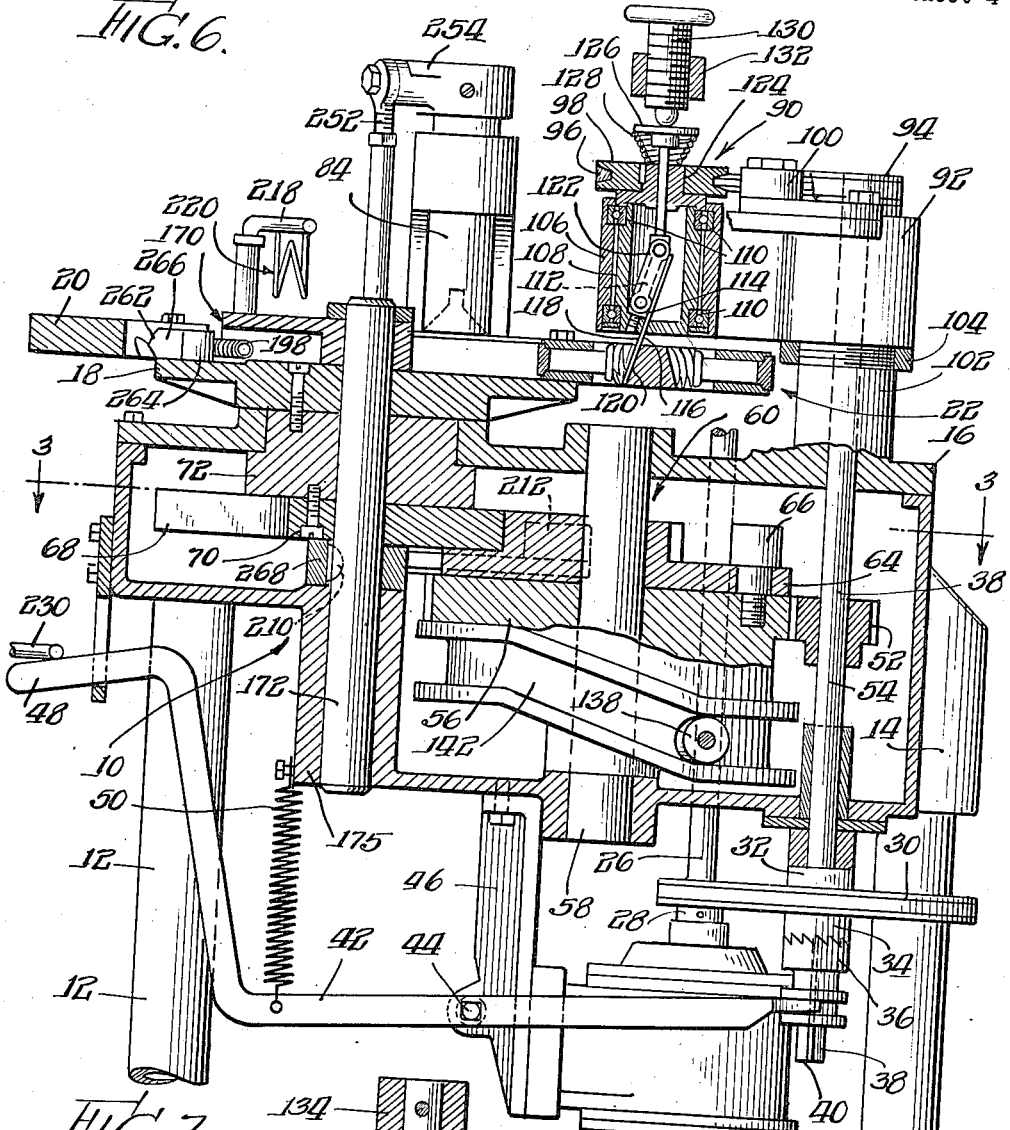
Figure 6 is a vertical cross sectional view taken on the line 6—6 of Figure 2.

An electric motor 24 positioned below the body portion of the machine, as shown in Figure 6, drives a pulley 28, on the motor shaft 26. This pulley 28 drives belt 30 which in turn drives another larger pulley 32. The hub of the pulley 32 has a clutching collar 34 which engages a shiftable clutching collar 36 slidably keyed to a shaft 38 by a key 40. The collar 36 is actuated by an operating lever 42 pivoted at 44 on a bracket 46. The lever 42 has a handle portion 48 which extends outwardly from the frame to be actuated by the operator. A spring 50 acting in cooperation with the lever 42 normally holds the slidable clutching collar 36 out of engagement with the collar 34 to disengage the driving means for the machine. The pulley 30 being free on the shaft 38 will therefore drive the shaft 38 only when the collars 34 and 36 are in engagement.

When the machine is to be operated, the handle 48 is pushed downwardly, as shown in Figure 6, which will thereby engage the driving collar 36 to drive the shaft 38. A pinion 52 keyed to the shaft 38 by a pin 54 drives a larger gear 56 on a shaft 58 which is supported in the main frame as indicated in Figure 6.

Referring to Figures 3 and 6, it will be noticed that a Geneva mechanism 60 forms a means for intermittently rotating the chuck turret or table 20 and also forms a means for shifting mechanism for opening and closing the jaws of the clutch for holding the artichokes. The Geneva mechanism comprises a disk or plate 64 mounted on the upper surface of the gear 56 and adapted to rotate with the gear. Mounted on the plate 64 is a driving pin 66 which drives the star wheel 68 of the geneva 60 in the usual manner. Keyed to the star wheel 68 by a key or pin 70 is a collar 72 which in turn is keyed to the supporting plate 18, which has mounted thereon the rotatable table 20 carrying the artichoke holding chucks.

Referring to Figure 8 of the drawings, the table 20 has positioned thereon five artichoke holding chucks 22, which consist of clamping or holding jaws 76 adapted positively to clamp the artichoke in position while it is undergoing different stages of treatment before being discharged from the machine.

During the rotation of the table or turret 20, five different operations take place, the first being the feeding of the artichoke by hand into the opening 78 of the chuck 22. After the artichoke has been inserted into the opening 78, the clamping jaws 76 automatically clamp the artichoke in position while the table is at rest and thereafter the table moves around to a position as indicated at 82, where the turret again stops so that the artichoke is positioned directly under centering or straightening means 84. This latter means shifts the artichoke to an upright position, or in other words, positions or centers the artichoke so that it is substantially vertical in the chuck holding means so that the artichoke is properly gauged for proper relationship with the top and bottom knives hereinafter described. In addition, also, due to its tapered construction, the means 84 straightens the stem end of the choke into a proper position, providing it has been put there in a crooked position.

While the table moves around to the next position, cutting means in the form of a pair of knives 88, see Figures 2 and 5, form substantially transverse cuts through the body of the choke, one of the cuts being formed through the leafy portion approximately in a plane with the outermost end of the body portion of the artichoke, and the other cut substantially parallel thereto but serving to sever the stem of the artichoke from the basal or opposite portion of the body of the artichoke, the cuts being preferably formed substantially in accordance with the disclosure in the patent to Herbert E. Gray and Arvid M. Erickson, No. 2,217,679, issued October 15, 1940, on an application filed April 22, 1935.

The knives 88 which perform the cutting operation are supported upon the motor shaft 26 and have means which provide for adjustment to accommodate different size artichokes and whereby different sizes of trimmed portions may be provided. This cutting operation automatically takes place as the holding chuck 22 moves from the position 82 to the position 86. When the holding chuck 22 assumes the position indicated by the numeral 86 in Figure 2, it comes to a stop directly under a coring device 90. This coring device 90 is preferably of the construction disclosed in the patent to G. D. Gardner, No. 1,802,972, issued April 28, 1931, and consists of a housing 92 which encloses the upper end of the hereinbefore mentioned shaft 38. The uppermost end of the shaft 38 has keyed to it a pulley 94 which drives a belt 96 to drive another pulley 98. A belt tightening pulley 100, as shown in Figure 2, provides means for keeping the belt 96 under tension, and to eliminate any slack therefrom.

The coring device 90 is supported on a standard 102 by a threaded collar 104 and forms a bearing for the shaft 38 which extends upwardly through the housing 92 to be keyed to the pulley 94.

As shown in Figure 6 of the drawings, the left-hand portion of the coring device consists of a circular housing 106 which is adapted to register approximately with the center axis of each of the artichoke grippers 22. A casing 108 is rotatably mounted on antifriction bearings 110 located at each of the opposite ends thereof, concentrically within the housing 106. The upper end of the casing 108, being keyed to the pulley 98, is thereby rotated by the belt 96 and the pulley 94.

A square guide shaft 112 is arranged within the interior of the casing 108 in a vertical and angularly inclined position. The shaft 112 is provided with a slide member 114 thereon, to one side of which a knife 116 is fixedly secured. The knife 116 is adapted to register with and lie in a slot 118, and is provided with a cutting edge 120 on one side thereof to cut in the direction of rotation of the casing 108. The guide shaft 112 is arranged on an inclined position within the casing 108 so that the slide member 114, with the knife 116 thereon, lies in the same inclined or angularly disposed position whereby the knife 116 as it rotates within the casing 108 prescribes a circular movement after it is projected from the casing 108 to thus cut a circular slot in any object into which it is penetrated, at a divergent angle to the vertical axis of the object being cored.

The knife slide 114 is pivotally connected by a pair of links 122 to an end of a shaft 124 that is journaled concentrically within the casing 108. The shaft 124 extends above the upper end of the casing 108 and is provided with a head 126 on the end thereof. An expansion spring 128 is interposed between the under side of the head 126 and the upper end of the casing 108. The shaft 124 is arranged on the axis of rotation of the casing 108, while the knife slide 114 is arranged off of said true axis of rotation, and hence the links 122 connect the lower end of the shaft 124 and the knife slide 114 in desirable relation, whereby the vertical reciprocating movement of the shaft 124 relative to the casing 108 causes the knife 116 to be projected from or drawn into the casing 108. The expansion spring 128 normally tends to keep the cutting knife 116 concealed within the rotary casing 108 and out of the path of travel of the grippers 76.

In order to protect the cutting blade 116 from the casing 108 into the path of the grippers 76, there is provided an adjustable striking member 130, having threaded engagement with a collar 132 formed on the end of an arm 134, which in turn is connected to the upper end of a reciprocating bar 136, as shown in Figure 4. The lower end of the bar 136 has attached thereto a roller 138 adapted to engage a cam track 140 on a rotatable member 142 which may be formed as part of the gear 56 and adapted to rotate therewith. Thus as the gear 56 rotates the cam 142, the roller 138 will travel in the cam track 140 to reciprocate the vertical bar 136 to raise and lower the striking head 130 and move the cutting blade 116 into and out of the housing 108 in timed relationship with the operation of the machine.

Upon further rotation of the table 20 in a clockwise direction, the chuck 22 will assume a position as indicated at 146, see Figure 2, which at this time will be directly below a punch operating device which, when operated, expels the heart of the artichoke which has just previously been severed from the leafy portion of the artichoke. This punch operating device consists of a plunger 148 pinned to a collar 150 on an extending arm 152 which has on its opposite end a collar 154 slidably mounted on a rounded portion of the bar 136. A coil spring 158 is interposed between the collar 154 and the collar of the arm 134, thereby to provide a resilient connection between the bar 156 and the arm 152.

Figure 7:
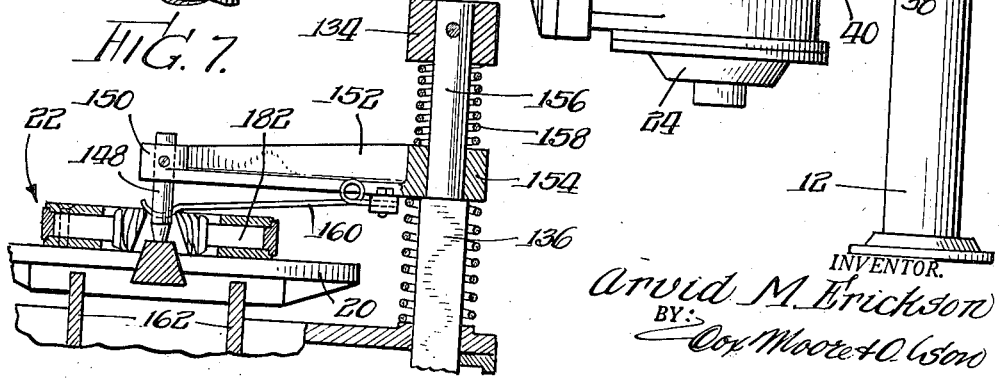
Figure 7 is a vertical cross sectional view taken on the line 7—7 of Figure 2 and illustrating the means for extracting the heart of an artichoke.
Figure 11:
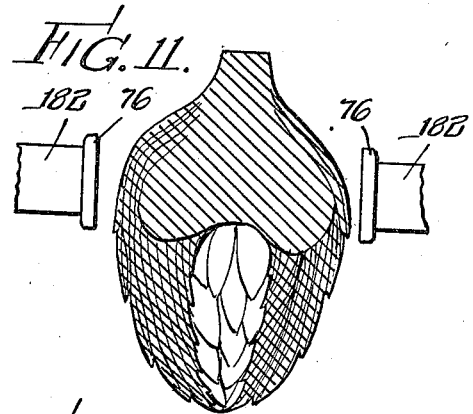
Figure 11 is a view showing the artichoke placed in position to be acted upon by the clamping means.
Figure 12:
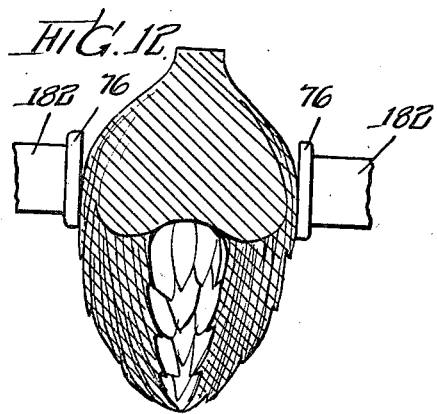
Figure 12 is a view of the artichoke showing it in clamped position.
Figure 13:
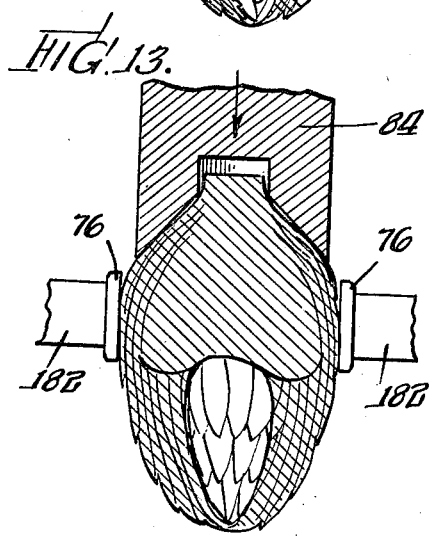
Figure 13 is a view of the artichoke as it is positioned vertically in the clamping means.
Figure 14:
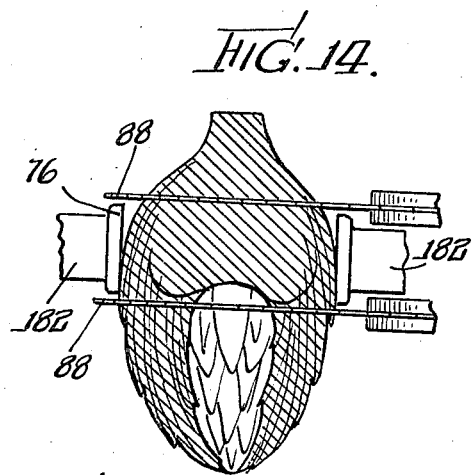
Figure 14 is a view of the artichoke showing the severing of the upper and lower portion thereof.
Figure 15:
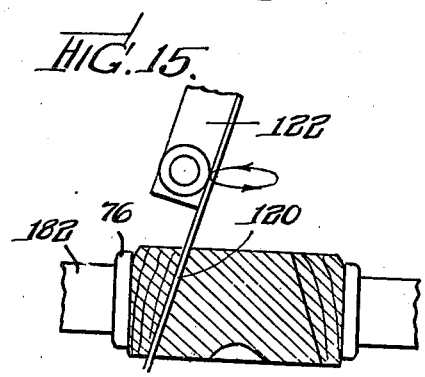
Figure 15 is a view showing the heart of the artichoke as it is being severed therefrom.
Figure 16:
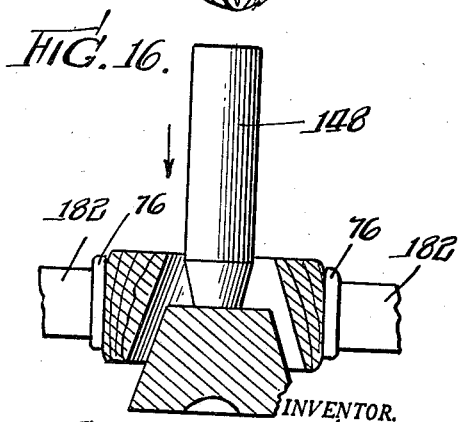
Figure 16 is a view showing the severed portion of the artichoke as it is forced out from the center of the artichoke.

As the bar 136 reciprocates in a vertical direction to operate the arm 134, it also operates the arm 152, as shown in Figure 7, to actuate the plunger 148 which is connected thereto. As the plunger 148 moves downwardly it presses the heart of the artichoke from the leafy portion. Before the punch 148 presses on the heart of the artichoke, the cam 170 moves to a position such that it presses slightly against the roller 192 on the ring of the chuck which holds the artichoke beneath the punch. This slightly releases the tension of the chuck jaws on the artichoke so as to enable the punch to press the heart out more easily. A spring 160 is provided to prevent the leafy portion of the artichoke from following the plunger 148 as it moves upwardly, see Figures 2 and 7.

When the heart of the artichoke is released from the leafy portion, it drops down through the chuck and into an enclosed slide 162, to be projected from the machine into some type of container.

As the chuck carrying the remainder of the artichoke is rotated to the next position, as indicated at 164, the clamping jaws 76 are released or opened to a position to allow the remaining portion of the artichoke to be released therefrom and to drop into a chute 166 having an upper hopper 168 to receive the discharged portion of the artichoke.

The means provided to operate the jaws of the clutch consists of a cam 170 clamped to a shaft 172 which is journaled in a bearing 175 on the main body portion of the machine. This shaft 172 also provides the central bearing shaft for the rotating table 20 and the Geneva star gear 68, although neither the table 20 nor the star gear 68 is keyed to this shaft.

Referring to Figures 8, 9 and 10 of the drawings, the chucks for holding the artichokes are constructed as follows: The main body of the chuck consists of a substantially circular ring portion 174 having upper and lower circular disks 176 and 178 mounted thereon. These disks are attached to the supporting plate 18 by bolts 180 which pass through the disks 176 and 178 and hold them rigidly with the rotating portion of the machine. Interposed between these two disks 176 and 178 are three arms 182 which carry on their outer ends the clamping devices 76, hereinbefore described. The inner end of one of the arms 182 is pivotally mounted on the clamping bolt 180, and the other two arms are pivotally mounted upon pins 184 which form means for holding the disks 176 and 178 in connection with the ring 174. The outward ends of the clamping arms 182 have pivotally connected links 186 which in turn are pivotally connected to the ring 174 by pins 188. Pins 189 connect the links 186 to the clamping arms 182. As shown in Figure 8 it will be seen that the ring 174 is provided with annular shoulders 191 on its upper and lower edges to provide a bearing seat for the upper and lower disks 176 and 178 which are also provided with annular shoulders 193 which interfit with the shoulder 191 to form a bearing surface between the ring 174 and the disks 176 and 178.

The annular ring portion of the chuck has a projection extending from its outward surface, as at 190, to provide a means for attaching a roller 192, which is supported by a pin 194, the pin being threaded into the projection 190 on the housing 174. Upon the under surface of the projection 190 an arm 196 is atached by means of a lock nut, and to this arm a spring 198 is connected normally to hold the clamping jaws in a closed position.

Referring to Figures 9 and 10, it will be understood that when the chuck housing 174 is rotated in a counterclockwise direction, the jaws 76 on the arm 182 will tend to be moved toward each other, or in other words, to form a circular area considerably smaller than the area formed when they are entirely open, as shown in Figure 10. When the chuck housing 174 is rotated in a clockwise direction, it will also be seen that the clamping jaws 76 will move away from each other and form a substantially larger circular opening to permit insertion of an artichoke. The upper and lower disks 176 and 178 are provided with a circular opening 193 to permit the artichoke to be inserted into the path of the clamping jaws 76.

Referring again to the cam member 170, see Figures 2 and 8, it will be seen that the main portion consists of a sector having an arcuate edge 200 which is adapted to engage the roller 192. In addition, the cam 170 has fixed to its upper surface an extension 202 adjustably attached to the main body portion of the cam 170 by a bolt 204 in a slot 206. It will be understood that the cam 170 and the extending portion 202 are adjustably clamped to the shaft 172 and any movement imparted to the shaft 172 will be transferred to the cam 170.

Referring to Figure 3 of the drawings, there is shown a cam arm 208 keyed to the shaft 172 at 210. This arm 208 is so positioned as to lie in the arcuate path of travel of the pin 66, which upon contacting the cam surface 212 of the arm 208 will move the arm 208 a number of degrees in a counterclockwise direction to oscillate the shaft 172 and thereby cause the cam 170 to oscillate in a counterclockwise direction.

It will now be understood that upon rotation of the table 20 and the chucks 22, the inward portion of the chuck body which carries the roller 192 will come in contact with the cam 170 at predetermined intervals, thereby causing the clamping jaws 76 to open or close at such a time as to either be in a position to receive an artichoke or release the remainder of one that has had the heart removed therefrom.

When the roller 192 is in contact with the cam 170, the clamping jaws 76 are open and in a position to receive an artichoke. At this time the machine is not in motion. The chucks are in position for the artichoke to be fed into the clamping jaws. Before the turret 20 starts its rotation, the pin 66 will come in contact with the surface 212 of the arm 208 to shift the cam 170 away from the roller 192 and thereby permit spring 198 to rotate the annular body portion of the chuck 174, thereby actuating the arms 182 to close about the artichoke and hold it in a fixed position. Thereafter the pin 66 operates the geneva to rotate the turret one station.

As the clamping chucks rotate with the turret and go through all the different stations as indicated, the roller 192 will again come into contact with the cam surface 216 of the extension 202. At this time the center of the chuck will be at the position 146 as shown in Figure 3 and be in position to have the center portion pressed from the heart of the artichoke. At this particular instant the roller 192 will again contact the extension of the cam 202 and slightly release the clamping jaws so that the plunger will be able to press the heart out more easily.

Referring again to the cam arm 208, as shown in Figure 3, there is provided a compression spring 214 which forces the arm against the disk 64 and into the path of the pin 66.

Upon further movement of the chuck from the position 146 to 164, the jaws will be entirely open and will disengage the remainder of the artichoke to be released into the hopper 168 and discharged from the machine.

Referring to Figures 1 and 3 of the drawings, there is provided a safety device or stop which will operate so as to prevent the operator from accidentally being injured. This device consists of a guard member 218 comprising a rod extending radially of the machine and having a downwardly projecting frame member 220. This safety stop is positioned directly in front of the plunger device and the circular saw blade. The outer end of the bar 218 forms a right angle to project downwardly through a sleeve 222 which is supported by brackets 224 on the main portion of the housing 10 of the machine, and the lower end of the bar 218 has attached thereto a collar 226. Also attached to the rod 218 is a link 228 which forms an attaching means for a curved bar 230, which has at its opposite end a curved section overlying the clutch operating handle 48. A pin 232, fixed in one of the brackets 224, provides a means for limiting the movement of the link 228 in either direction, and a spring 234, which has one of its ends fixed to the bracket 224 and the other end attached to the collar 226, provides a means to retain the safety stop bar 218 in a position as shown in Figure 2. If for any reason the operator of the machine should accidentally move the bar 218 toward the plunger 84, the rod 218 would turn in a counterclockwise direction, which would turn the link 228 in a counterclockwise direction, and therefore release the curved bar 230 from the position shown in Figure 3 to the dotted position as indicated. It would thereby release the clutch operating handle 48, which would permit the spring 50 to disengage the clutch collar 36 from the collar 34, and thereby prevent further rotation of the machine.

Referring to Figure 1 of the drawings, there is provided an oil reservoir 236 and an oil pump 238, which provide means for continuously lubricating the machine during its operation. The oil pump 238 may be operated through the agency of the motor 24.

Referring again to the means for reciprocating the device for pressing out the heart of the artichoke and the device for operating the knife blade which cuts the heart free from the main portion of the artichoke, it will be seen, as indicated in Figures 1 and 4, that there is provided a link connection 240 which is adjustably attached to the collar 154 by a threaded I-bolt 242 and extends downwardly to connect with a pivoted bell crank lever 244. The other arm of the bell crank 244 has connected to it a link 246 which in turn connects to another pivoted bell crank 248 which in turn is connected to another link 250, having on its upper end an adjustable, pivoted connection 252 to an arm 254 which is secured to the plunger 84 at its upper end by means of a set screw 256. There is provided on the side of the machine a bracket 258 which supports a bearing 260 for the plunger 84 to reciprocate vertically. It will be understood that upon vertical movement of the bar 136 to shift the plunger 148 and operate the coring knife 116, it will also impart movement to the links 244, etc., to operate the self-centering plunger 84. All these operations take place when the machine is in a stationary position and all the devices are retracted or out of operating position when the rotating table is in motion.

Referring again to the chucks 22, it will be noted that they are provided with the hereinbefore mentioned spring attaching link 196 which provides means for attaching the spring 198 at one end thereof, the spring 198 being attached to a stationary portion of the rotating table at its other end, as indicated at 262. There is also provided on the annular body portion of the clutch 174 the semicircular notch which is part of the projection 190. This notch will engage a rubber bumper 264 which will thereby prevent the annular ring portion 174 from rotating in a counterclockwise direction in excess of what is necessary, thereby preventing the jaws 76 from actually coming in contact with each other. This rubber bumper 264 is held in position by some type of fastening means 266, as indicated in Figure 2 of the drawings.

The present application is a continuation of my co-pending application, Serial No. 238,512, filed November 3, 1938, for Method of and apparatus for trimming artichokes.

Numerous changes may be made in the form, construction and arrangement of the parts without departing from the spirit of the invention or sacrificing any of its attendant advantages, and the right is hereby reserved to make all such changes as fairly fall within the scope of the following claims.

The invention is hereby claimed as follows:

1. An artichoke trimming machine comprising a turret, a plurality of chucks carried by the turret, each adapted circumferentially to grip the leafy portion of an artichoke to hold it, means adapted to contact the stem and butt of the artichoke to center and to position the artichoke while thus held by the chuck, means for forming parallel lines of cut transversely of the stem axis of said artichoke through the solid portion thereof while held by said chuck, means for forming a circular cut through the solid portion of the severed artichoke section held by said chuck, means for punching the severed heart section from the held section and for delivering said punched portion to a predetermined point of discharge, and means for releasing the chuck for discharging the portion unexpelled from the chuck to a separate point of discharge.

2. In a device of the closs described, the combination of a support, a turret mounted thereon, first and second parallel shafts mounted on said support, one of said shafts carrying one part of a Geneva mechanism and the other of said shafts carrying another part of the Geneva mechanism, means for operating one of said shafts whereby intermittently through said Geneva mechanism to actuate the other shaft to turn the turret periodically, a plurality of chucks mounted on said turret, each including a plurality of shiftable members, resilient means for shifting said chuck members in one direction, cam means on said first mentioned shaft, an actuator rotatable with said second mentioned shaft and positioned to actuate said cam means upon rotation of said second mentioned shaft, and means on each chuck adapted to be associated with said cam means whereby upon rotation of said turret and the bringing of a chuck to a predetermined position with relation to said cam means, actuation of said cam means serves to shift the movable members of said chuck to close upon an artichoke while said turret is stationary.

3. In a device of the class described, the combination of a support, a turret rotatable upon said support and including a plurality of chucks mounted thereon and rotatable therewith, each of said chucks including shiftable elements to receive an artichoke therebetween, a centering station disposed adjacent the path of movement of said chucks carried by said turret, means for intermittently rotating said turret for carrying a chuck into registration with said centering means, said centering means including a plunger having a conical under side and having a depression to receive the stem of an artichoke when said artichoke is positioned in the chuck, and means for reciprocating said plunger in a direction normally of the plane of movement of the turret a predetermined amount whereby to center the stem of said artichoke substantially transversely with respect to the plane of said chuck and to push the artichoke into the chuck a predetermined distance.

4. In a device of the class described, the combination of a support, a turret horizontally rotatable upon said support and including a plurality of chucks mounted thereon and rotatable therewith, each of said chucks including shiftable elements to receive an artichoke therebetween, a centering station disposed above the path of movement of said chucks carried by said turret, power means for intermittently rotating said turret for carrying a chuck into registration with said centering means, said centering means including a plunger having a conical under side and having a depression to receive the stem of an artichoke when said artichoke is positioned in the chuck, means for vertically reciprocating said plunger a predetermined amount whereby to center the stem of said artichoke substantially transversely with respect to the plane of said chuck and to push the artichoke into the chuck a predetermined distance, guard means disposed in advance of the bottom portion of said plunger means and acting as a barrier, and means automatically operated by movement of said guard means for disconnecting said power means.

5. In a device of the class described, the combination of a support, a turret rotatable in a fixed plane on said support, said turret including a plurality of spaced apart chucks mounted to rotate parallel to said plane, each chuck having a central axis, actuatable jaws carried by said chuck and adapted to grip an artichoke when positioned centrally of said chuck opening, plunger means reciprocatingly mounted on said support in registration with the path of movement of a chuck opening, means for intermittently operating said turret to bring the chuck opening immediately in registration with said plunger means, and means automatically actuated when said chuck opening is so registered to reciprocate the plunger means to contact the stem of an artichoke held in said chuck means, said plunger means having its bottommost surface provided with a recess to receive said stem of said artichoke and having conical shoulders adapted to contact the shoulders of the leafy basal portion of the artichoke to position the artichoke predeterminedly in said chuck.

6. In a device of the class described, the combination of a support, a turret mounted thereon, a chuck mounted on said turret, including a turnable disk having a central aperture, a plurality of jaws pivotally mounted on said disk near the outer end and near the outer periphery of the disk, a plurality of links having one end connected to the disk and the other end connected to the inner end of each of said jaws, the periphery of said disk having a lateral offset, a friction roller thereon, a shaft parallel with the central axis of said chuck, an arcuate cam mounted thereon and mounted on said turret, Geneva mechanism for operating said turret, including an intermittently operated member and a continuously operating member, and means actuated by the continuously operating member of one of said members for actuating said cam to shift to closed position the shiftable members of a chuck while said turret and said chuck are at rest.

7. An artichoke trimming machine comprising a turret, a chuck carried by said turret for holding an artichoke, means for cutting said held artichoke, means for intermittently rotating said turret to carry the held artichoke to and from said cutting means, means operated by the rotary movement of said turret for opening said chuck to permit the discharge of said artichoke and the insertion into the chuck of another artichoke, and means shiftable concentrically about the axis of rotation of said turret to cause said chuck to close upon and grip the inserted artichoke while the turret is at rest.

8. An artichoke trimming machine comprising a turret, a chuck carried by said turret for holding an artichoke, means for performing a cutting operation on said artichoke while so held, means for intermittently rotating said turret to carry the artichoke to and from said first mentioned means, a movable member carried by said chuck for opening and closing the same, mechanism rotatable concentrically about the axis of said turret and moving wholly within the path of rotation of said chuck to engage said member during a portion of the movement of said turret, said engagement moving said member to open said chuck, and means for disengaging said mechanism and said member during a rest period of the turret to cause said member to close said chuck.

9. An artichoke trimming machine comprising a turret, a chuck carried by said turret for gripping the stem of an artichoke, means for cutting the leaves from the artichoke held by said chuck, means for trimming the butt of said artichoke, means for cutting the trimmed butt, means for intermittently rotating said turret, and means revolvable concentrically about the axis of rotation of said turret and associated with said chuck to cause the chuck to grip the stem of said artichoke and hold it before the turret starts to move.

10. A device of the class described in combination with a support, a turret mounted thereon and having a central shaft, a plurality of chucks mounted on said turret, each of said chucks including a plurality of jaws pivotally mounted thereon, a plurality of links having one end connected to the chuck and the other end connected to the inner end of each of said jaws, the periphery of each chuck having a lateral offset, a friction roller thereon, an arm keyed to said shaft, the outer end of said arm having an actuating lug, a slotted Geneva member mounted on said shaft, a second shaft parallel to said first mentioned shaft, a continuously driven Geneva member mounted on said second shaft, said continuously driven Geneva member having an actuator thereon adapted upon rotation to advance the slotted Geneva member one step whereby similarly to rotate the turret, means normally pressing the lug and the arm into the path of movement of the actuator on said continuously driven Geneva member whereby to actuate said arm at a predetermined time during the continuous rotation of said Geneva member, a cam mounted on said shaft and actuated by movement of said arm whereby to shift the friction roller of each chuck during the stationary movement of the turret whereby to cause the closure of the chuck jaws during one of the pauses in the intermittent rotation of said turret.

11. In a device of the class described in combination with a support, a turret mounted thereon for intermittent rotation, said turret having a plurality of chuck members having jaws adapted to close to grip an object to be processed, said turret having a central shaft about the axis of which said chucks are adapted concentrically to move, said shaft having thereon cam means and each of said chucks having cooperative means adapted shiftably to be actuated by contact with the cam means during a pause in the movement of said turret whereby to actuate the chuck mechanism, continuously operable means on said support, an intermittent drive disposed between said continuously operable means and said turret and said cam comprising two complemental members, one of them adapted to be actuated continuously by said source of power and the other adapted to be intermittently operated by said continuously operable member, said intermittently operating member being mounted on the same shaft on which the cam is mounted, and an oscillatable arm likewise mounted on said shaft and turnable therewith and having means disposed in the path of movement of an actuator on said continuously operable member of the intermittent means for oscillating said shaft to oscillate said cam during a pause in a movement of said turret whereby to actuate the said chuck.

12. In an automatic machine for trimming artichokes, the combination of a support, a turret mounted thereon and disposed in a horizontal plane for intermittent rotation, a plurality of chucks carried by said turret adapted to be carried around thereby to a plurality of cutting and trimming stations, a pair of knives associated with said support and said turret for cutting through the body of each artichoke held by a chuck during the intermittent movement of the turret, power means on said support for actuating said turret and said knives, a safety stop disposed on said support in overlying relation to the turret and arranged to permit the free passage thereunder and thereacross of artichokes carried by said chucks, said safety stop being shiftably mounted on said support and having a connection with said power means of said machine whereby on predetermined shiftable movement of said safety stop toward said cutting knives the power mechanism for operating said machine is discontinued.

13. In a device of the class described, the combination of a turret, continuously operating power means for intermittently rotating the turret, including a constantly moving member disposed centrally of said turret and operated by said power means and a member intermittently driven therefrom, a plurality of chucks mounted on said turret and movable therewith, each of said chucks including shiftable means adapted to grip and hold an artichoke, and means shiftably disposed concentrically about said constantly moving member and operable by the constantly moving member of said means while said turret is at rest for operating the chuck mechanism to cause the chuck to grip an artichoke, said intermittently driven member serving thereafter to operate said turret.

14. In a device of the class described the combination of a support, a turret rotatable upon said support and including a plurality of chucks mounted thereon and rotatable therewith, each of said chucks including relatively shiftable elements to receive an artichoke therebetween, a centering station disposed adjacent the path of movement of each of said chucks carried by said turret, means for intermittently rotating said turret for carrying a chuck holding an artichoke into registration with said centering means, and means for shifting said centering means in a path normal to the path of movement of the chuck and adapted to engage the stem and butt portion of the artichoke whereby to shift said artichoke relatively to and within the chuck in a direction normal to the path of movement of the chuck, and rotatable severing means mounted on said support and lying in the path of movement of said chuck for subsequently cutting through the body of the artichoke on a line transverse to the central stem axis of said artichoke.

15. In a device of the class described in combination with a turret adapted to rotate about a central axis, a plurality of chucks spaced about said turret and rotatable intermittently therewith including relatively shiftable members adapted to receive an artichoke therebetween and to grip the same to hold said artichoke during the operation of the cutting means on said artichoke, means associated with the path of movement of said chucks and artichokes held therein for cutting the body of the artichoke to expose the heart thereof, means adapted to sever the heart from the artichoke, and punching means adapted to contact the severed heart to push it from the artichoke while held by the chuck members, and means operatively synchronized with the punching operation for slightly releasing the gripping pressure of the chuck members on the artichoke whereby to facilitate the punching operation.

16. An artichoke trimming machine comprising a turret, a chuck carried by said turret for holding an artichoke, means for cutting said artichoke, means for intermittently rotating said turret to carry the artichoke to and from said cutting means, means operated by the rotary movement of said turret for opening said chuck to permit the discharge of said artichoke and means shiftable in a path disposed inside of the path of movement of the chuck jaws as they move with the turret to cause said jaws to close upon and grip the artichoke while the turret is at rest.

17. An artichoke trimming machine comprising a turret, a chuck carried by said turret for holding an artichoke, means for cutting said artichoke, means for intermittently rotating said turret to carry the artichoke in an orbital path concentrically about the axis of rotation of said turret and relative to said cutting means, shiftable means disposed concentrically within the path of orbital movement of said chuck and operative while stationary for opening said chuck, and mechanism for shifting said means independently of the orbital movement of said open chuck and while said chuck is at rest, for causing said chuck to be closed prior to the further movement of said chuck in its orbital path.

18. An artichoke trimming machine comprising a turret, a chuck carried by said turret for holding an artichoke, means for cutting said artichoke, means for intermittently rotating said turret to carry the artichoke in an orbital path concentrically about the axis of rotation of said turret and relative to said cutting means, means disposed concentrically within the path of orbital movement of said chuck for opening said chuck, said means being shiftable concentrically of and independently of the orbital movement of said open chuck and while said chuck is at rest, for causing said chuck to be closed prior to the further movement of said chuck in its orbital path, said means being adjustable to control the period of time the chuck remains open.

19. A machine for processing articles comprising a movable turret, a chuck thereon for holding an article, means associated with the path of movement of said turret and chuck for cutting said article while held in said chuck, intermittent motion mechanism for intermittently rotating said turret to move the chuck in a closed path relative to said cutting means, means cooperating with the chuck during the movement of the chuck along its path for opening the chuck to permit insertion of an article into said chuck, and mechnaism having a portion forming a part of said intermittent motion mechanism for shifting said chuck opening means relatively to said stationary open chuck to cause said chuck to close upon and grip the article inserted in said chuck and while said chuck is enjoying a period of rest during its intermittent movement whereby the article will be gripped by said chuck prior to resumption of movement of the chuck along its path of movement.

20. A machine for processing articles comprising a movable turret, a chuck thereon for holding an article, means associated with said turret and chuck for cutting said article while held in said chuck, intermittent motion mechanism having intermittently engageable and disengageable driving and driven members for intermittently rotating said turret to move the chuck with an article held therein from a point of reception to said cutting means, shiftably mounted means engageable with the chuck as the turret in moving carries the chuck to said point of reception for opening the chuck to permit insertion of an article into said chuck when stationary at the point of reception, means positioned for operation by the driving member when disengaged from the driven member for shifting said chuck opening means relative to said stationary open chuck to release said chuck, and means operatively associated with the chuck to close said chuck upon release of the chuck by said opening means, whereby the article will be gripped by said chuck when the turret is at rest and the chuck positioned at the point of reception.

ARVID M. ERICKSON.